UNITED STATES PATENT OFFICE.

JAMES LINN JOHNSON, OF WILKES-BARRE, PENNSYLVANIA.

AUXILIARY ENGINE-SUPPORT BRACKET FOR AUTOMOBILES.

1,320,234.  Specification of Letters Patent.  Patented Oct. 28, 1919.

Application filed November 30, 1918. Serial No. 264,838.

*To all whom it may concern:*

Be it known that I, JAMES LINN JOHNSON, a citizen of the United States, residing at Wilkes-Barre, in the county of Luzerne and State of Pennsylvania, have invented certain new and useful Improvements in Auxiliary Engine-Support Brackets for Automobiles; and I do hereby declare the following to be a full, clear, and exact description of the invention, such as will enable others skilled in the art to which it appertains to make and use the same.

This invention relates to motor vehicles, and more particularly to a reinforcing support to be applied to the motor and the chassis of an automobile so as to reinforce and act as an auxiliary to or to take the place of the usual supporting bracket connecting the side of the engine to the chassis frame.

It is one of the objects of the present invention to provide an auxiliary and reinforcing support or bracket, which may be applied to the usual engine hanger or bracket, especially of the type utilized for suspending the engines of the Ford motor cars. It is an especial object of the present invention to provide an auxiliary bracket or support peculiarly adapted for attachment to the Ford engine and chassis to aid in conjunction with the usual support or bracket, thereby tending to prevent the breaking of the latter, and also to take the place of the usual Ford bracket, in the event of it being fractured. It is another object of the present invention to provide an auxiliary support or bracket which may be utilized in combination with the Ford engine and chassis without requiring the removal of the usual Ford bracket, and which may be utilized to connect the engine to the chassis irrespective of the line of break of the usual bracket.

It has been proposed to supply auxiliary brackets to replace broken brackets in installations of the type above referred to, but so far as I am aware, no means have heretofore been provided which are capable of ready attachment to the Ford engine and frame to reinforce the usual bracket without the said bracket has been demolished, and therefore enable the attachment, or substitution rather, of the replacement bracket, and it is a particular characteristic of my invention that it may be applied to the Ford installation before the fracture of the Ford bracket, and may be utilized irrespective of the line of fracture of the bracket.

To that end the invention consists of a bracket provided for such attachment and replacement, and consists in the construction and in details, as more particularly hereinafter pointed out with respect to the embodiment of the invention disclosed in the accompanying drawings in which—

Figure 1 is a perspective view of the improved bracket shown as applied to the usual bracket of the Ford motor of the type ordinarily utilized in the Ford motor car.

Fig. 2 is a perspective view of the improved bracket detached from the engine and frame.

The Ford motor car is provided with an engine illustrated diagrammatically at 2 in Fig. 1, on each side of which there is provided a hanger or bracket 3, which is usually made of an embossed stamping, and is brazed and riveted rigidly in position, the bracket being offset on the line 4 from the flange of the engine casing, and thence extending upwardly and having an outwardly turned lug 5 adapted to be placed upon the side members of the vehicle frame, and bolted thereto so as to properly hang the engine thereon. For the purpose of stiffening the usual bracket 3, the top lug 5, and the body of the bracket is provided with embossed ribs or shoulders indicated at 6—6 at the top bracket, so that there is formed a depression 7 between the shoulders or ribs 6. Likewise, the upper portion of the bracket 3 is provided with rearwardly embossed portions and side flanges, but even with these reinforcements these brackets frequently break along the line 4, or at the zone of junction between lug 5 and the upright portion or body of the bracket.

My invention is designed so as to be readily applicable to engine supporting brackets, without requiring the removal thereof and before the fracture or breaking thereof, so that my improved bracket becomes an auxiliary and reinforcing bracket to the one usually on the motor, and thus tends to prevent the breaking of the usual bracket and to accomplish the application of the auxiliary bracket, which is shown and generally designated at A, Fig. 1, is provided with a body portion 10, of suitable dimensions and proportions and has side-members or legs 11, which are spaced apart so as to straddle the sides of the usual bracket 3, the M. JOHNSON.
CIRCULAR SWING.
APPLICATION FILED NOV. 2, 1918.
1,320,235.
Patented Oct. 28, 1919.
3 SHEETS—SHEET 2.
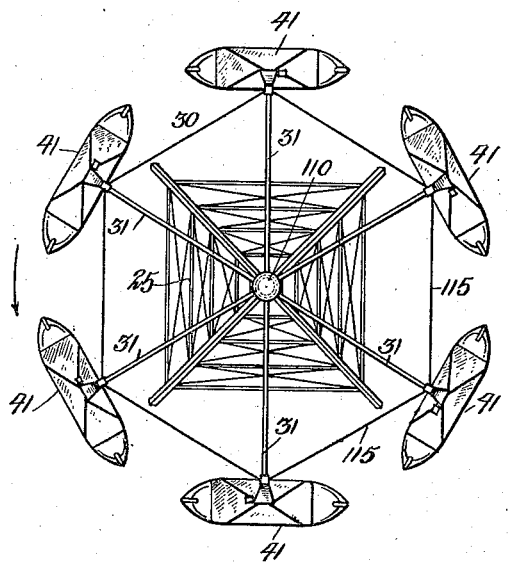
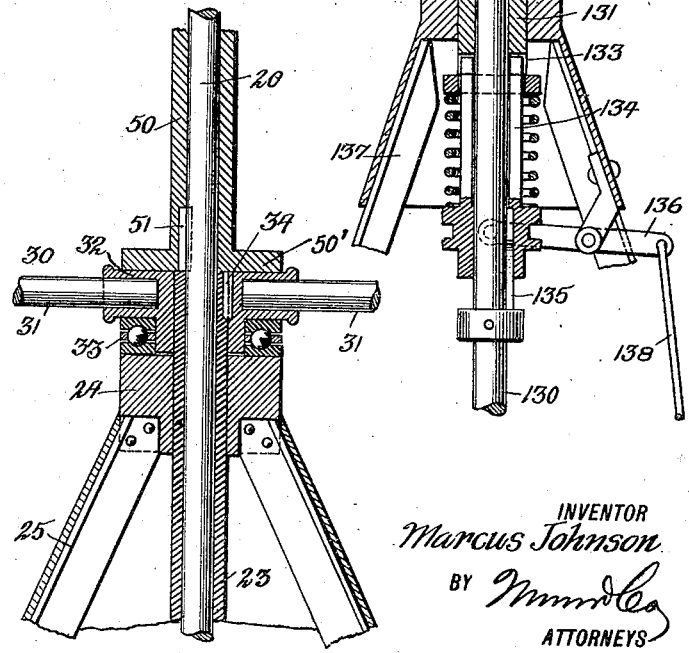
WITNESSES
INVENTOR
Marcus Johnson
BY
ATTORNEYS M. JOHNSON.
CIRCULAR SWING.
APPLICATION FILED NOV. 2, 1918.
1,320,235.
Patented Oct. 28, 1919.
3 SHEETS—SHEET 3.
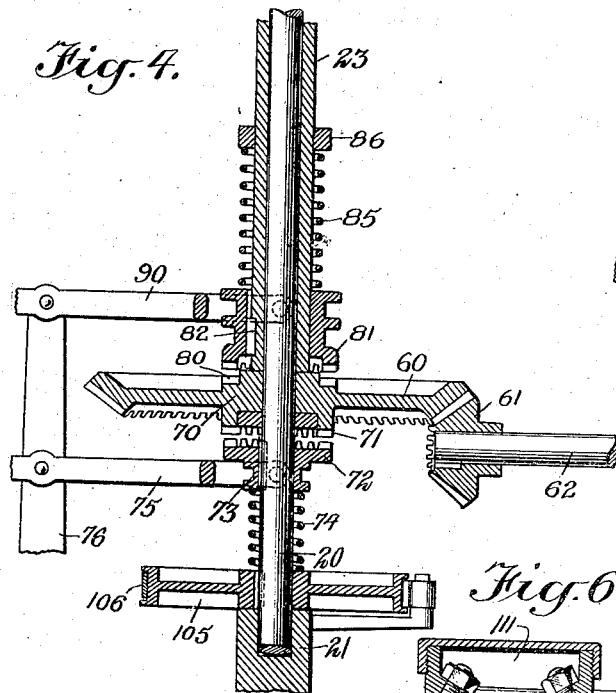
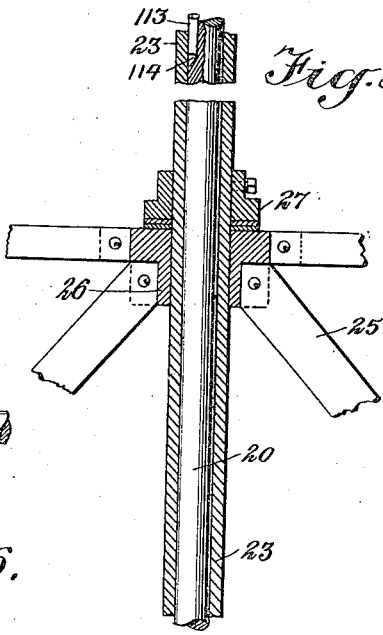
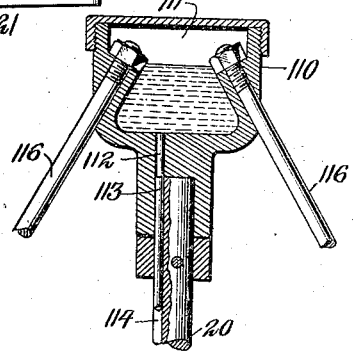
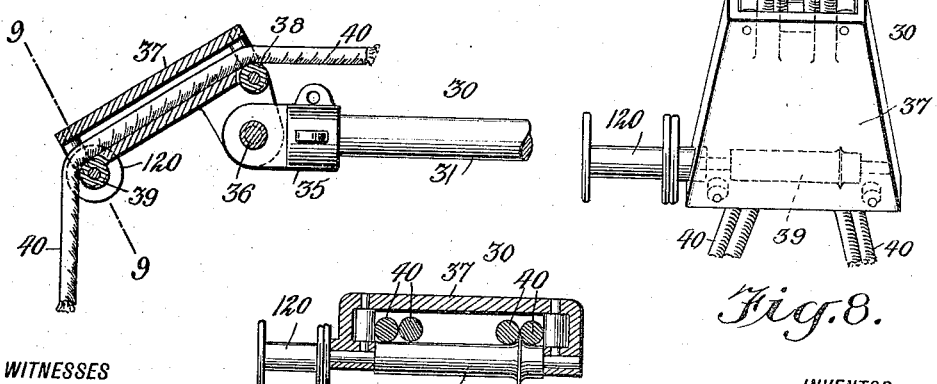
WITNESSES
INVENTOR
Marcus Johnson
BY
ATTORNEYS

UNITED STATES PATENT OFFICE.

MARCUS JOHNSON, OF BROOKLYN, NEW YORK.

CIRCULAR SWING.

1,320,235.  Specification of Letters Patent.  Patented Oct. 28, 1919.

Application filed November 2, 1918. Serial No. 260,798.

*To all whom it may concern:*

Be it known that I, MARCUS JOHNSON, a citizen of the United States, and a resident of the city of New York, borough of Brooklyn, in the county of Kings and State of New York, have invented a new and Improved Circular Swing, of which the following is a full, clear, and exact description.

The invention relates to amusement apparatus such as is used in pleasure resorts, parks, exhibition grounds and like places, and its object is to provide a new and improved circular swing of the centrifugal type arranged to provide an exhilarating ride for its patrons. Another object is to enable the operator in charge of the apparatus to vary the action at will thus producing varying sensations in the occupants of the passenger carriers during the ride. Another object is to provide a swing which is simple and durable in construction, safe in operation and not liable to get easily out of order.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a side elevation of the circular swing with the front passenger carrier and its support omitted;

Fig. 2 is a plan view of the same;

Fig. 3 is an enlarged sectional side elevation of the upper portion of the apparatus;

Fig. 4 is a similar view of the driving mechanism of the circular swing;

Fig. 5 is a similar view of the support for the sleeve mounted to turn on the mast or central post of the apparatus;

Fig. 6 is an enlarged sectional side elevation of the lubricating means on the upper end of the mast;

Fig. 7 is an enlarged sectional side elevation of one of the supporting guides for one of the flexible supports for a passenger carrier;

Fig. 8 is a plan view of the same;

Fig. 9 is a cross section of the same on the line 9—9 of Fig. 7; and

Fig. 10 is a sectional side elevation of a modified form of the driving mechanism for the mast and sleeve.

The lower end of a mast or central post 20 is journaled in a step 21 mounted on the ground or other support 22 and on the mast 20 is mounted to turn loosely a sleeve or hollow shaft 23 journaled near its upper end in a bearing 24 held on the top of a suitable tower or framework 25 erected on the support 22. The sleeve 23 is also mounted to turn in a bearing 26 (see Figs. 1 and 5) on which rests a collar 27 secured on the sleeve 23 for supporting the sleeve 23 and allowing the same to turn independent of the mast 20. The upper end of the sleeve 23 is provided with a superstructure 30 in the form of radial arms 31 attached to the hub 32 (see Figs. 1 and 3) mounted to turn on ball bearings 33 arranged on the top of the bearing 24. The hub 32 is fastened by a key 34 to the sleeve 23 and when the latter is rotated then the superstructure 30 rotates with the sleeve. The outer end of each arm 31 of the superstructure 30 is provided with a head 35 (see Figs. 7 and 8) provided with a pivot 36 on which is mounted to swing a guide 37 provided with rollers 38 and 39 over which pass cables or other flexible connections 40 supporting a passenger carrier 41 of any approved construction, usually in the form of a car or gondola, as indicated in Figs. 1 and 2. The flexible connections 40 of each passenger carrier 41 after leaving the roller 38 connect with and wind and unwind on a drum 50 fastened by a key 51 or other suitable means to the mast 20 directly above the hub 32, as plainly shown in Figs. 1 and 3.

By the arrangement described the revolving sleeve 23 and its superstructure 30 carry the flexible connections 40 and consequently the passenger carriers 41 bodily around thereby allowing the passenger carrier 41 to fly outward by centrifugal force. By connecting the flexible connections 40 with the drum 50 on the mast 20 held stationary for a time, as hereinafter more fully explained, the said flexible connections are wound up on the drum and consequently the passenger carriers 41, besides being carried around and moved outwardly by centrifugal force, are bodily carried upward thus providing an exhilarating ride for the occupants.

In practice, the guides 37 for the several passenger carriers 41 are preferably located in different horizontal planes, and the ends of the flexible connections 40 are attached to the drum 50 at corresponding horizontal planes to insure proper winding up and unwinding of the flexible connections on the drum 50. This drum 50 is provided with a flange 50'.

In order to rotate the mast 20 and the sleeve 23 independently one of the other or in unison, the following arrangement is made, special reference being had to Figs. 1 and 4: On the lower portion of the mast 20 is mounted to rotate loosely a bevel gear wheel 60 in mesh with a bevel pinion 61 secured on a shaft 62 journaled in suitable bearings 63 arranged on the support 22. The shaft 62 is provided with a gear wheel 64 in mesh with a pinion 65 secured on a fly wheel shaft 66 provided with a flywheel 67 connected by suitable means 68, such as belt and pulley, with a motor 69 of any approved construction. Thus when the motor is running a rotary motion is given by the gearing described to the bevel gear wheel 60. The hub 70 of the gear wheel 60 is provided at its bottom with a clutch member 71 adapted to be engaged by a clutch member 72 mounted to slide and to rotate with the mast 20 by providing a suitable key and keyway 73, as indicated in Fig. 4. The clutch member 72 is supported on the upper end of a spring 74 coiled on the lower portion of the mast 20. The spring 74 serves normally to hold the clutch member 72 in engagement with the clutch member 71 to rotate the mast 20 by the gear wheel 60. The clutch member 72 is adapted to be moved out of engagement with the clutch member 71 at the will of the operator and for this purpose use is made of a shifting lever 75 fulcrumed on a bracket 76 held on the support 22. The top of the hub 70 of the gear wheel 60 is provided with a clutch member 80 adapted to be engaged by a clutch member 81 mounted to slide on and to turn with the lower end of the sleeve 23 by the use of a suitable key and keyway 82, as plainly indicated in Fig. 4. A spring 85 bears on the top of the clutch member 81 to normally hold the latter in engagement with the clutch member 80 to cause the gear wheel 60 to rotate the sleeve 23. The upper end of the spring 85 abuts against a collar 86 attached to the sleeve 23. The clutch member 81 is engaged by a shifting lever 90 fulcrumed on the bracket 76 and like the clutch lever 75 under the control of the attendant of the amusement apparatus. It will be noticed that by the driving mechanism described the mast 20 and the sleeve 23 can be rotated in unison, or one can be stopped by throwing the corresponding clutch member 72 or 81 out of engagement with the corresponding clutch member 71 or 80 on the gear wheel 60.

On the sleeve 23 is secured a brake drum 100 a short distance above the collar 86 and this brake drum 100 is engaged by a brake band 101 connected with an operating lever 102 under the control of the attendant in charge of the apparatus. By the arrangement described the sleeve 23 may be braked to retard the rotary motion of the sleeve and its superstructure 30 without interfering with the rotation of the drum 50 on the mast 20.

The mast 20 is provided at its lower end with a brake drum 105 engaged by a brake band 106 connected with an operating lever 107 under the control of the attendant to brake the mast 20 and with it the drum 50 to allow unwinding of the flexible supports 40 to lower the passenger carriers 41 similar to the case of an elevator.

On the top of the mast 20 is mounted loosely a cap 110 adapted to form an oil well 111 containing oil or other lubricant. From the bottom of the oil well 111 leads a port 112 adapted to register with a tube 113 which extends along a groove 114 in the mast 20 and terminates a distance from the lower end of the groove 114 (see Fig. 5) a distance below the upper end of the sleeve 23 thus delivering lubricant to the joint between the sleeve 23 and the mast 20 to lubricate the same.

In order to give the desired rigidity to the superstructure 30 the heads 35 are rigidly connected with each other by links 115 (see Fig. 2) and braces 116 connect the said heads 35 with the cap 110 (see Fig. 1).

Each of the rollers 39 is provided at one outer end with a spool 120 (see Figs. 7, 8 and 9) for an electric conductor employed for conducting electricity to electric lamps in the corresponding passenger carrier 41.

In the modified form shown in Fig. 10, the mast 130 is driven by a reversible motor and the sleeve 131 is made short and is provided at the upper end with superstructure 132 similar to the superstructure 30 previously described. The lower end of the sleeve 131 is provided with a clutch member 133 adapted to be engaged by a clutch member 134 mounted to turn with and to slide on the mast 130 by the use of a suitable key and keyway 135 as indicated in said Fig. 10. The clutch member 134 is engaged by a shifting lever 136 fulcrumed on the framework 137 and connected with a link 138 which reaches to the ground and is under the control of the operator in charge to permit the latter to engage the clutch member 134 with the clutch member 133 or to disengage the same therefrom. When the clutch members 133 and 134 are in engagement and the mast 130 is rotated then the sleeve 131 and its superstructure 132 rotate with the mast. When the clutch member 134 is disengaged from the clutch member 133 then the mast 130 may be kept running while the sleeve 131 and its superstructure 132 are allowed to run free until the momentum is expended. It is understood that the mast 130 is provided with a drum 140 for winding up the flexible connections 40 the same as previously explained. The drum 140 is provided with a flange 140'.

The operation is as follows:

In Fig. 4, the clutch members 81 and 72 are shown out of engagement with the clutch members 80 and 71 and hence both the mast 20 and the sleeve 23 are at a standstill and the flexible connections 40 support the passenger carriers 41 perpendicularly to allow of loading the said carriers with passengers. The attendant now actuates both shifting levers 90 and 75 so that the springs cause the clutch members 72 and 81 to engage with the clutch members 71 and 80 of the wheel 60 continually driven from the motor 68 as previously explained. A rotary motion is now given to both the mast 20 and the sleeve 23 whereby the superstructure 30 is carried around and with it the flexible connections 40 and the passenger carriers 41, and the latter are caused to fly outward by centrifugal force. After a lapse of time the clutch member 72 is thrown out of engagement with the clutch member 71 to cause the mast 20 to stop rotating while the sleeve 23 keeps on turning and with it the superstructure and the passenger carriers, but during this rotation of the superstructure 30 the flexible connections 40 wind up on the drum 50 thus drawing the passenger carriers 41 gradually upward and inward toward the guides 37 of the superstructure 30. When the passenger carriers near the guides 37 of the superstructure 30, as indicated in dotted lines in Fig. 1, then the clutch 72 is again thrown into engagement with the clutch member 71 to again cause the mast 20 to rotate with the sleeve 23 and its superstructure 30. The clutch member 81 is now thrown out of engagement with the clutch member 80 and the brake lever 102 is actuated to brake the sleeve 23 and stop its rotation. The further turning of the power driven mast 20 now causes the flexible connections to unwind from the drum 50 thus lowering the passenger carriers 41, and when the latter near the ground the operator throws out the clutch 72 and manipulates the clutch lever 107 to brake the mast 20 and thus bring the passenger carriers 41 gradually to a stop. It will be noticed that the passenger carriers 41 are carried around bodily, swung outward and raised and then lowered straight down to the ground for disembarking the passengers. The above operation is next repeated for another ride.

Having thus described my invention, I claim as new and desire to secure by Letters Patent:

1. An amusement apparatus, comprising an upstanding supporting frame, a mast arranged within the supporting frame and adapted to turn upon its axis, a sleeve rotatable upon the mast and carrying a supporting element, means connected with the supporting frame and engaging the supporting element, a superstructure carried by the sleeve, a passenger carrier, a flexible element connected with the passenger carrier and with the superstructure, winding means connected with the upper portion of the mast and connected with the flexible element, and means to rotate the sleeve and mast independently of each other or in unison with each other.

2. An amusement apparatus, comprising an upstanding supporting frame, a mast arranged within the supporting frame and adapted to turn upon its axis, a sleeve rotatable upon the mast and carrying a supporting element, means connected with the supporting frame and engaging the supporting element, a superstructure carried by the sleeve, a passenger carrier, a flexible element connected with the passenger carrier and with the superstructure, winding means connected with the upper portion of the mast and connected with the flexible element, a driving gear arranged near the lower end of the mast and rotating about the same and provided upon its opposite sides with clutch elements, a clutch element carried by the lower end of the sleeve to drive the same and adapted to engage one clutch element of the gear, a clutch element carried by the lower end of the mast to drive the same and adapted to engage the other clutch element of the gear, and means to shift the clutch elements of the sleeve and mast.

3. An amusement apparatus, comprising an upstanding supporting frame, a mast arranged within the supporting frame to turn upon its axis, a sleeve rotatable upon the mast, means connected with the frame to support the sleeve so that its lower end is arranged above the lower end of the mast, a superstructure carried by the upper portion of the sleeve, a passenger carrier, a flexible element connected with the passenger carrier and with the superstructure, winding means connected with the upper portion of the mast and connected with the flexible element, a driving gear rotatable upon the lower end of the mast and arranged near and beneath the lower end of the sleeve and provided with upper and lower clutch elements, a clutch element carried by the lower end of the sleeve and adapted to engage the upper clutch element, a clutch element carried by the lower end of the mast to engage the lower clutch element, means to shift the clutch elements of the sleeve and mast, and means to rotate the driving gear.

4. An amusement apparatus, comprising a mast, mounted to turn and provided at its upper portion with a drum, a sleeve mounted on the said mast and provided at its upper end with a superstructure, means for rotating the said mast and the said sleeve one independent of the other or in unison, passenger carriers, and flexible connections supporting the said passenger carriers and extending over the said superstructure and winding up or unwinding on the same drum.

5. An amusement apparatus, comprising a mast mounted to turn on its axis, a sleeve mounted to turn on the said shaft independent thereof, a driving gear under the control of an operator and adapted to be connected with the said mast and the said sleeve to rotate the mast and sleeve independent one of the other or in unison, a superstructure on the sleeve, a drum on the mast, a passenger carrier, and a flexible connection supporting the said passenger carrier, passing over the said superstructure and winding on the said drum.

6. An amusement apparatus, comprising a mast mounted to turn and provided at its upper portion with a drum, a sleeve mounted on the said mast and provided at its upper end with a superstructure, means for rotating the said mast and the said sleeve one independent of the other or in unison, passenger carriers, flexible connections supporting the said passenger carriers and extending over the said superstructure and winding up or unwinding on the said drum, and a brake mechanism connected with the said mast to check the speed thereof on unwinding the flexible connections from the drum.

7. An amusement apparatus, comprising a mast mounted to turn and provided at its upper portion with a drum, a sleeve mounted on the said mast and provided at its upper end with a superstructure, means for rotating the said mast and the said sleeve one independent of the other or in unison, passenger carriers, flexible connections supporting the said passenger carriers and extending over the said superstructure and winding up or unwinding on the said drum, and a brake mechanism connected with the sleeve to check the rotation thereof.

8. An amusement apparatus, comprising a mast mounted to turn and provided at its upper portion with a drum, a sleeve mounted on the said mast and provided at its upper end with a superstructure, means for rotating the said mast and the said sleeve one independent of the other or in unison, passenger carriers, flexible connections supporting the said passenger carriers and extending over the said superstructure and winding up or unwinding on the said drum, and independent brake mechanisms of which one is connected with the said mast and the other with the said sleeve.

9. An amusement apparatus, comprising a mast mounted to turn on its axis, a sleeve, mounted to turn on the said shaft independent thereof, a driving gear under the control of an operator and adapted to be connected with the said mast and the said sleeve to rotate the mast and sleeve independent one of the other or in unison, arms extending radially from the upper end of the said sleeve, guides on the outer ends of the arms, a drum on the said mast, passenger carriers, and flexible connections supporting the said passenger carriers, passing over the said guides and winding on the said drum.

10. An amusement apparatus, comprising a mast mounted to turn on its axis, a sleeve mounted to turn on the said shaft independent thereof, a driving gear under the control of an operator and adapted to be connected with the said mast and the said sleeve to rotate the mast and sleeve independent one of the other or in unison, arms extending from the said sleeve, guide members pivoted on the outer ends of the said arms and provided with guide rollers, a drum on the said mast, passenger carriers, and flexible connections supporting the said passenger carriers, passing over the rollers of the said guides and winding on the said drum.

11. In an amusement apparatus, a mast mounted to turn on its axis, a sleeve mounted to turn on the mast, passenger carriers, flexible connections supporting the said passenger carriers, engaging the said sleeve and the said mast, a cap on the said mast and forming an oil well, and a pipe conducting oil from the said oil well to the upper portion of the joint between the mast and sleeve.

MARCUS JOHNSON.

Copies of this patent may be obtained for five cents each, by addressing the "Commissioner of Patents, Washington, D. C."